(12) United States Patent
Smiljanovski et al.

(10) Patent No.: US 9,989,020 B2
(45) Date of Patent: Jun. 5, 2018

(54) AUTO-IGNITION INTERNAL COMBUSTION ENGINE WITH EXHAUST-GAS TURBOCHARGING AND EXHAUST-GAS RECIRCULATION

(71) Applicant: Ford Global Technologies, LLC, Dearborn, MI (US)

(72) Inventors: Vanco Smiljanovski, Bedburg (DE); Joerg Kemmerling, Monschau (DE); Helmut Matthias Kindl, Aachen (DE); Andreas Kuske, Geulle (NL); Franz Arnd Sommerhoff, Aachen (DE); Franz J. Brinkmann, Huerth-Efferen (DE); Werner Willems, Aachen (DE); Claudia Conee, Herzogenrath (DE); Michael Forsting, Moenchengladbach (DE); Claudia Katharina Herudek, Aachen (DE); Tim Franken, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 15/153,631

(22) Filed: May 12, 2016

(65) Prior Publication Data

US 2016/0333827 A1     Nov. 17, 2016

(30) Foreign Application Priority Data

May 15, 2015  (DE) .................. 10 2015 208 957
Jun. 18, 2015  (DE) .................. 10 2015 211 228

(51) Int. Cl.
*F02M 26/06*   (2016.01)
*F02B 37/10*   (2006.01)
(Continued)

(52) U.S. Cl.
CPC ............. *F02M 26/08* (2016.02); *F02B 37/10* (2013.01); *F02M 26/07* (2016.02); *F02M 26/23* (2016.02)

(58) Field of Classification Search
CPC ........ F02M 26/08; F02M 26/07; F02M 26/23; F02B 37/10
(Continued)

(56) References Cited

U.S. PATENT DOCUMENTS

| 4,669,269 A | 6/1987 | Dinger et al. |
| 4,955,199 A * | 9/1990 | Kawamura ........... F02B 37/013 60/608 |

(Continued)

FOREIGN PATENT DOCUMENTS

| DE | 10023022 A1 | 11/2001 |
| DE | 602004004947 T2 | 11/2007 |

(Continued)

*Primary Examiner* — Hoang Nguyen
(74) *Attorney, Agent, or Firm* — Julia Voutyras; McCoy Russell LLP

(57) ABSTRACT

Embodiments of an internal combustion engine are provided. In one example, an engine includes at least one cylinder, an intake system for supplying charge air to the at least one cylinder, an exhaust-gas discharge system for discharging exhaust gas from the at least one cylinder, a first exhaust-gas turbocharger including a first turbine arranged in the exhaust-gas discharge system and a first compressor arranged in the intake system; and an exhaust-gas recirculation (EGR) system. The EGR system includes a line which branches off from the exhaust-gas discharge system and opens into the intake system, a second exhaust-gas turbocharger comprising an EGR turbine arranged in the line on a shaft and an EGR compressor arranged in the line on the (Continued)

shaft upstream of said EGR turbine, and an EGR cooler positioned between the EGR turbine and the EGR compressor.

20 Claims, 5 Drawing Sheets

(51) Int. Cl.
  *F02M 26/08* (2016.01)
  *F02M 26/07* (2016.01)
  *F02M 26/23* (2016.01)
(58) Field of Classification Search
  USPC ........... 60/599, 602, 612, 605.2; 123/568.11, 123/568.12, 568.19, 568.2
  See application file for complete search history.

(56) References Cited

U.S. PATENT DOCUMENTS

| | | | |
|---|---|---|---|
| 5,771,868 A * | 6/1998 | Khair | F02B 33/32 123/568.12 |
| 6,324,846 B1 * | 12/2001 | Clarke | F01N 3/306 60/605.2 |
| 6,889,503 B2 | 5/2005 | Hoecker et al. | |
| 6,955,162 B2 * | 10/2005 | Larson | F02D 23/02 123/568.11 |
| 7,013,879 B2 * | 3/2006 | Brookshire | F02B 37/001 123/568.12 |
| 8,522,756 B2 | 9/2013 | Vuk et al. | |
| 2005/0022525 A1 | 2/2005 | Ellmer et al. | |
| 2005/0091978 A1 * | 5/2005 | Sumser | F01D 17/16 60/608 |
| 2008/0022686 A1 * | 1/2008 | Amdall | B60K 6/12 60/716 |
| 2013/0125544 A1 * | 5/2013 | Mond | F02D 23/00 60/611 |
| 2013/0276754 A1 * | 10/2013 | Breuer | F02B 33/00 123/434 |

FOREIGN PATENT DOCUMENTS

| | | |
|---|---|---|
| DE | 102008018583 A1 | 10/2009 |
| DE | 102010003002 A1 | 9/2011 |
| DE | 102012017275 A1 | 3/2014 |
| DE | 102013215536 A1 | 5/2014 |
| EP | 1186767 A2 | 9/2001 |
| EP | 1640596 A1 | 3/2006 |
| GB | 308585 | 3/1929 |
| WO | 9718388 A1 | 5/1997 |
| WO | 985449 A1 | 12/1998 |
| WO | 0047879 A1 | 8/2000 |
| WO | 2013045821 A1 | 4/2013 |

* cited by examiner

AUTO-IGNITION INTERNAL COMBUSTION ENGINE WITH EXHAUST-GAS TURBOCHARGING AND EXHAUST-GAS RECIRCULATION

CROSS REFERENCE TO RELATED APPLICATION

This application claims priority to German Patent Application No. 102015208957.6, filed May 15, 2015, and to German Patent Application No. 102015211228.4, filed Jun. 18, 2015, the entire contents of each of which are hereby incorporated by reference for all purposes.

FIELD

The disclosure relates to an auto-ignition supercharged internal combustion engine.

BACKGROUND AND SUMMARY

Internal combustion engines may be charged (e.g., supercharged, turbocharged, etc.), wherein intake air supplied to the cylinders of the engine is at a pressure higher than barometric pressure. Supercharging serves primarily for increasing power. The air required for the combustion process is compressed, as a result of which a greater air mass can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. If the swept volume is reduced, it is thus possible to shift the load collective toward higher loads, at which the specific fuel consumption is lower. By means of supercharging in combination with a suitable transmission configuration, it is also possible to realize so-called downspeeding, with which it is likewise possible to achieve a lower specific fuel consumption.

Supercharging consequently assists in the constant efforts in the development of internal combustion engines to minimize fuel consumption, that is to say to improve the efficiency of the internal combustion engine.

For supercharging, use is in this case made of at least one exhaust-gas turbocharger, in which a compressor and a turbine are arranged on the same shaft. The hot exhaust-gas flow is supplied to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained. A charge-air cooler may be provided in the intake system downstream of the compressor, by means of which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. Compression by cooling takes place.

The advantage of the exhaust-gas turbocharger in relation to a mechanical charger is that no mechanical connection for transmitting power exists or is required between charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

On the other hand, in the case of exhaust-gas turbocharging, difficulties are often encountered, inter alia in generating and providing an adequately high charge pressure even at low engine speeds. A torque drop is observed if a particular engine speed is undershot. Said torque drop is understandable if one takes into consideration that the charge pressure ratio is dependent on the turbine pressure ratio. If, for example, the engine speed is reduced, this leads to a smaller exhaust-gas flow and therefore to a lower turbine pressure ratio. As a result, the charge pressure ratio likewise decreases in the direction of lower engine speeds, which equates to a torque drop.

In the prior art, it is sought, using a variety of measures, to improve the torque characteristic of a supercharged internal combustion engine. This is achieved for example by means of a small design of the turbine cross section and simultaneous provision of an exhaust-gas blow-off facility. Such a turbine is also referred to as a wastegate turbine. If the exhaust-gas flow rate exceeds a critical value, a part of the exhaust-gas flow is, within the course of the so-called exhaust-gas blow-off, conducted via a bypass line past the turbine. Said approach has the disadvantage that the supercharging behavior is inadequate at relatively high engine speeds or in the case of relatively large exhaust-gas flow rates. Furthermore, according to the prior art, the blown-off exhaust gas is conducted past the turbine without being used further, and without the energy available in the hot exhaust gas being utilized.

The torque characteristic of a supercharged internal combustion engine may furthermore be improved by means of multiple, that is to say at least two, turbochargers arranged in parallel, that is to say by means of multiple turbines of relatively small turbine cross section arranged in parallel, wherein turbines are activated successively with increasing exhaust-gas flow rate.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by designing the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine. In the bypass line there is arranged a shut-off element for controlling the exhaust-gas flow conducted past the high-pressure turbine.

With targeted configuration of the supercharging, it is duly also possible for advantages to be achieved in terms of exhaust-gas emissions, for example, in the case of the diesel engine, for nitrogen oxide emissions to be reduced without losses in efficiency, and/or for hydrocarbon emissions to be favorably influenced. To adhere to future limit values for pollutant emissions, however, further measures are necessary.

Here, the focus is on inter alia the reduction of nitrogen oxide emissions, which are of high relevance in particular in diesel engines. Since the formation of nitrogen oxides requires not only an excess of air but rather also high temperatures, one concept for lowering the nitrogen oxide emissions consists in developing combustion processes with lower combustion temperatures.

Here, exhaust-gas recirculation, that is to say the recirculation of exhaust gases from the exhaust-gas discharge system into the intake system, is expedient in achieving this aim, wherein it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air, which has possibly been compressed in a compressor. Exhaust-gas recirculation is also suitable for reducing the emissions of unburned hydrocarbons in the part-load range.

To obtain a considerable reduction in nitrogen oxide emissions, high exhaust-gas recirculation rates may be used, which may be of the order of magnitude of $x_{EGR}\approx60\%$ to 80%.

To be able to realize such high recirculation rates, effective cooling of the exhaust gases for recirculation, with an intense lowering of the exhaust-gas temperature, is indispensable, that is to say such high recirculation rates may not be achievable without lowered exhaust-gas temperatures. A cooler may be provided in the line for exhaust-gas recirculation, which cooler lowers the temperature in the hot exhaust-gas flow and thus increases the density of the exhaust gases. The temperature of the cylinder fresh charge which results upon the mixing of the charge air with the recirculated exhaust gases is likewise reduced in this way, as a result of which the cooler in the recirculation line contributes to improved charging of the cylinders with fresh mixture.

However, the inventors herein have recognized an issue with the above approaches. To be able to cool the large quantities of exhaust gas required for high recirculation rates, and to be able to extract and dissipate the amount of heat that arises here, it is the case that coolers of very large volume may be required, which make dense packaging impossible.

Accordingly, systems and methods are provided herein at least partly address the above issues. In one example, a system comprises an engine including at least one cylinder, an intake system for supplying charge air to the at least one cylinder, an exhaust-gas discharge system for discharging exhaust gas from the at least one cylinder, a first exhaust-gas turbocharger including a first turbine arranged in the exhaust-gas discharge system and a first compressor arranged in the intake system, and an exhaust-gas recirculation (EGR) system. The EGR system includes a line which branches off from the exhaust-gas discharge system and opens into the intake system, a second exhaust-gas turbocharger comprising an EGR turbine arranged in the line on a shaft and an EGR compressor arranged in the line on the shaft upstream of said EGR turbine, and an EGR cooler positioned between the EGR turbine and the EGR compressor.

In this way, the second exhaust-gas turbocharger, arranged in the EGR system and hence also referred to as an EGR turbocharger, may include a compressor upstream in an exhaust gas flow path of a turbine to compress the exhaust gas to a high pressure and then subsequently expand the exhaust gas, thus lowering the temperature of the exhaust gas. An EGR cooler may be disposed intermediate the compressor and turbine, thus further lowering exhaust gas temperatures. Due to the very low temperature of the exhaust gas, high rates of EGR may be provided, thus lowering emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
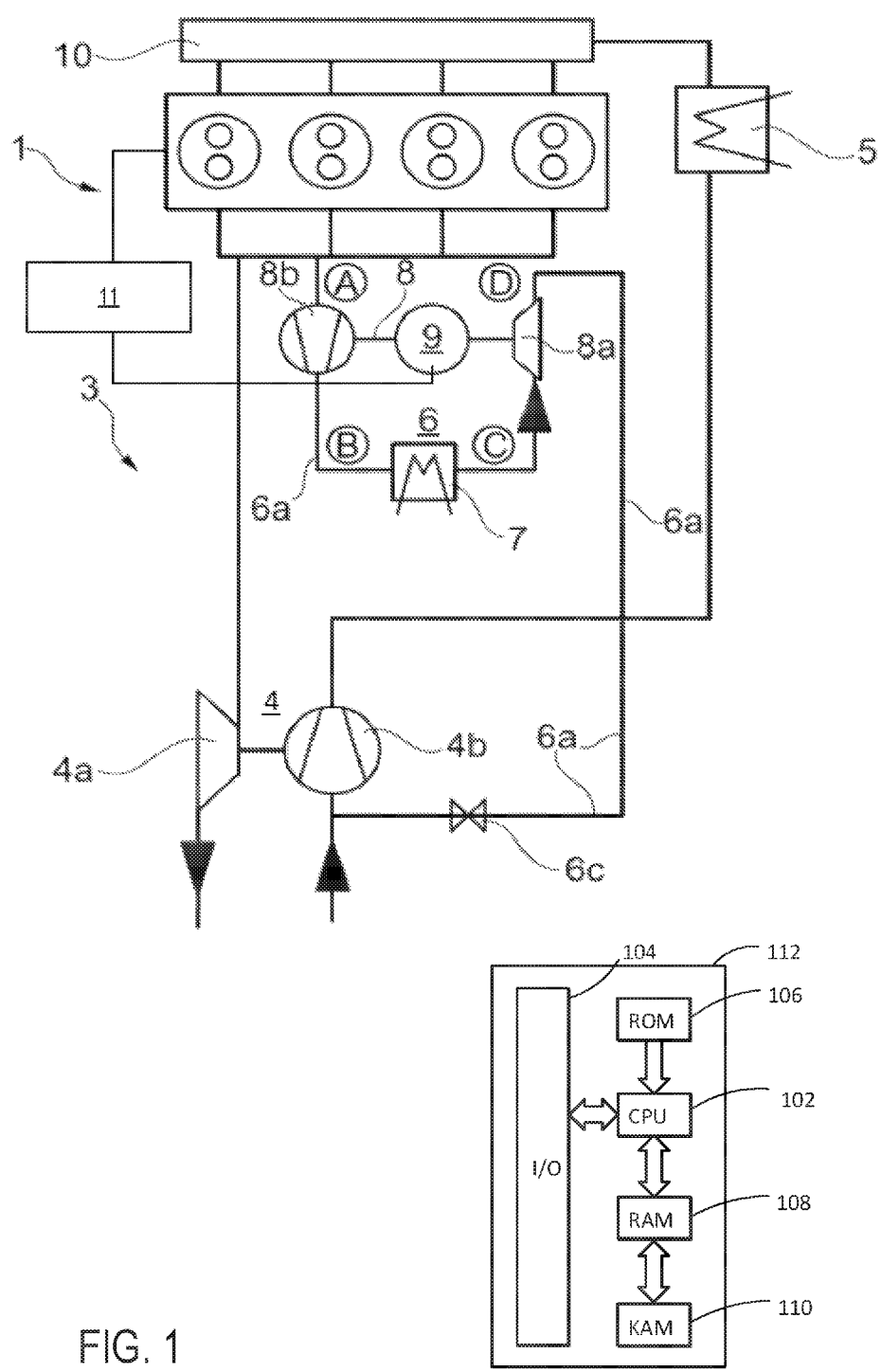
FIG. 1 schematically shows a first embodiment of an internal combustion engine.

An auto-ignition internal combustion engine of the type mentioned in the introduction is used as a motor vehicle drive unit. Within the context of the present disclosure, the expression "internal combustion engine" encompasses auto-ignition diesel engines and also hybrid internal combustion engines, which utilize a hybrid combustion process with auto-ignition, and hybrid drives which comprise not only the auto-ignition internal combustion engine but also an electric machine which can be connected in terms of drive to the internal combustion engine and which receives power from the auto-ignition internal combustion engine or which, as a switchable auxiliary drive, additionally outputs power. In some examples, a spark-ignited combustion engine may be used without departing from the scope of the disclosure.

The internal combustion engine to which the present disclosure relates is a supercharged internal combustion engine.

In summary, with regard to the exhaust-gas turbocharging of internal combustion engines, it can be stated that an improvement of the torque characteristic in particular at low engine speeds or in the presence of small exhaust-gas flow rates is of significance, for which reason the use of a mechanical supercharger, possibly in combination with an exhaust-gas turbocharger, may be advantageous.

The advantage of a mechanical supercharger in relation to an exhaust-gas turbocharger consists in that, in general, the mechanical supercharger can generate and make available the demanded charge pressure independently of the present operating state of the internal combustion engine, in particular also at low rotational speeds of the crankshaft. This applies in particular to a mechanical supercharger which can be driven, alternatively, by way of an electric machine. An electric auxiliary drive may also be used for assisting an exhaust-gas turbocharger at low engine speeds or in the presence of small exhaust-gas flow rates.

The internal combustion engine to which the present disclosure relates is an exhaust-gas-turbocharged internal combustion engine.

The internal combustion engine to which the present disclosure relates is furthermore equipped with at least one exhaust-gas recirculation arrangement comprising a line, which branches off from the exhaust-gas discharge system and which opens into the intake system, for recirculation of exhaust gas.

According to embodiments disclosed herein, an auto-ignition supercharged internal combustion engine includes an exhaust-gas recirculation arrangement that allows high recirculation rates. The auto-ignition supercharged internal combustion engine includes at least one cylinder, an intake system for supplying charge air to the at least one cylinder, an exhaust-gas discharge system for discharging exhaust gas from the at least one cylinder, at least one exhaust-gas turbocharger which comprises a turbine arranged in the exhaust-gas discharge system and a compressor arranged in the intake system, and at least one exhaust-gas recirculation arrangement which comprises a line which branches off from the exhaust-gas discharge system and opens into the intake system. In the line for exhaust-gas recirculation, there is provided an exhaust-gas turbocharger which comprises an EGR turbine arranged in the line on a shaft and which comprises an EGR compressor arranged in the line on the shaft upstream of said EGR turbine, an EGR cooler being provided between the EGR turbine and the EGR compressor.

The exhaust gas for recirculation is cooled during the course of the exhaust-gas recirculation, wherein, according to the disclosure, in the line for exhaust-gas recirculation, there is provided a compressor for compressing the exhaust gas before the cooling process. Furthermore, downstream of the cooler, there is arranged a turbine in which the cooled exhaust gas can expand, whereby the exhaust-gas temperature is lowered significantly once again.

According to the disclosure, the compressor and the turbine are combined to form an exhaust-gas turbocharger and are arranged on the same shaft of the charger, such that the turbine, hereinafter also referred to as EGR turbine, at least jointly drives the compressor, hereinafter also referred to as EGR compressor. It may be the case that the power provided by the EGR turbine is not sufficient for driving the EGR compressor, and an auxiliary drive may be provided which is activated when indicated and fills the power gap for the drive of the EGR compressor.

The power gap that may exist can be reduced or minimized through suitable guidance of the line for exhaust-gas recirculation. If the exhaust gas is extracted from the exhaust-gas discharge system upstream of the turbine by way of high-pressure EGR, the exhaust-gas pressure at the inlet of the EGR compressor is relatively high, whereby the compressor pressure ratio is reduced while maintaining the same outlet pressure, and the compressor power that is imparted can be reduced.

If it is then also the case that the line for exhaust-gas recirculation opens into the intake system upstream of the compressor of the at least one exhaust-gas turbocharger, a high turbine pressure ratio at the EGR turbine is realized, which is higher than the compressor pressure ratio. A high level of drive power is then available for the EGR compressor. A power gap that may exist with regard to the drive of the EGR compressor is, at most, small.

That the exhaust gas for recirculation is compressed before the cooling process gives rise to numerous advantageous effects. Firstly, it is possible for a cooler of relatively small volume to be provided, which permits dense packaging of the exhaust-gas recirculation arrangement and thus of the drive unit as a whole. Secondly, the compression permits, in the first place, an expansion after the cooling process, during which expansion the exhaust gas is cooled significantly once again.

The cooling according to the disclosure of the exhaust gas for recirculation leads to much lower exhaust-gas temperatures than conventional cooling without compression and expansion, as a result of which the approach according to the disclosure ensures or permits the realization of very high exhaust-gas recirculation rates.

The internal combustion engine according to the disclosure consequently provides an auto-ignition supercharged internal combustion engine which is improved with regard to the exhaust-gas recirculation arrangement and by means of which, in particular, it is possible to realize high recirculation rates.

Embodiments of the supercharged internal combustion engine are provided in which a valve for adjusting the recirculated exhaust-gas flow rate is arranged in the recirculation line of the at least one exhaust-gas recirculation arrangement. Here, embodiments of the supercharged internal combustion engine are provided in which the valve is arranged in the line downstream of the EGR turbine or upstream of the EGR compressor.

When operating an internal combustion engine with exhaust-gas turbocharging and exhaust-gas recirculation, a conflict arises if the exhaust gas for recirculation is extracted from the exhaust-gas discharge system upstream of the turbine by way of high-pressure EGR, and is no longer available for driving the turbine.

If exhaust gas is recirculated by way of high-pressure EGR, the exhaust-gas flow supplied to the turbine simultaneously decreases. The smaller exhaust-gas flow through the turbine results in a smaller turbine pressure ratio. With decreasing turbine pressure ratio, the charge pressure ratio likewise decreases, which equates to a smaller charge-air flow or lower charge pressure. Aside from the decreasing charge pressure, problems may additionally arise in the operation of the compressor with regard to the surge limit of the compressor.

For this reason, embodiments of the auto-ignition supercharged internal combustion engine may be provided in which the line for exhaust-gas recirculation branches off from the exhaust-gas discharge system downstream of the turbine of the at least one exhaust-gas turbocharger. A low-pressure EGR arrangement of said type may be provided instead of or in addition to a high-pressure EGR arrangement.

In this context, embodiments of the auto-ignition supercharged internal combustion engine may be provided in which the line for exhaust-gas recirculation opens into the intake system upstream of the compressor of the at least one exhaust-gas turbocharger. Then, the pressure gradient required between the exhaust-gas discharge system and the intake system for the delivery of the exhaust gas for recirculation can generally be realized more easily than if the line for exhaust-gas recirculation opened into the intake system downstream of the compressor.

By contrast to the high-pressure EGR arrangement, in which exhaust gas is extracted from the exhaust-gas discharge system upstream of the turbine and introduced into the intake system generally downstream of the compressor, in the case of a low-pressure EGR arrangement exhaust gas which has already flowed through the turbine is recirculated to the inlet side. Here, it is not disadvantageous that exhaust gas can be conducted through the compressor in a low-pressure EGR arrangement, because in general exhaust gas is used which has been subjected to exhaust-gas aftertreatment, in particular in a particle filter, downstream of the turbine. There is therefore no risk of depositions in the compressor which change the geometry of the compressor, in particular the flow cross sections, and thereby impair the efficiency of the compressor.

Nevertheless, in the context of the present disclosure, embodiments of the auto-ignition supercharged internal combustion engine are provided in particular in which exhaust gas is extracted from the exhaust-gas discharge system upstream of the turbine by way of high-pressure EGR, that is to say embodiments in which the line for exhaust-gas recirculation branches off from the exhaust-gas discharge system upstream of the turbine of the at least one exhaust-gas turbocharger.

The reason for this can be seen in the fact that the pressure at the inlet into the EGR compressor is higher if the exhaust gas is extracted from the exhaust-gas discharge system upstream of the turbine and the compression of the exhaust gas for recirculation is performed proceeding from this considerably higher pressure level. Then, in the context of the compression, it is possible either for the exhaust gas to be compressed to a higher pressure with the same amount of compressor work, or else for the required compressor power, that is to say the compressor power to be imparted, to be reduced. Taking into consideration the fact that the EGR turbine drives the EGR compressor and it may be the case that the power provided by the EGR turbine is not sufficient for driving the EGR compressor, that is to say the drive power for the EGR compressor may be increased or supplemented using an auxiliary drive, both variants have proven to be advantageous because the drive power that may have to be provided by an auxiliary drive is reduced or minimized in the case of the embodiment in question. This is proven to be advantageous in particular in the case of an electric auxiliary drive being used, because the electrical energy available on board a motor vehicle is limited. The pressure to which the exhaust gas is compressed by way of the EGR compressor, that is to say the pressure at the outlet of the EGR compressor, approximately corresponds to the inlet pressure into the EGR turbine, proceeding from which the compressed exhaust gas expands in the EGR turbine. Consequently, the turbine pressure ratio at the EGR turbine likewise increases with higher compressor pressure ratio. If the EGR compressor compresses the exhaust gas to a higher pressure, the compressor work to be imparted increases, but at the same time the available drive power, which is provided by the EGR turbine, also increases.

For the reasons stated above, embodiments of the auto-ignition supercharged internal combustion engine are also provided in which the line for exhaust-gas recirculation opens into the intake system upstream of the compressor of the at least one exhaust-gas turbocharger. This embodiment ensures a high turbine pressure ratio at the EGR turbine and thus an increase in the available drive power for the EGR compressor. The turbine pressure ratio is higher than the compressor pressure ratio. With regard to the use of an auxiliary drive and a power gap that may have to be filled in the drive power of the EGR compressor, the embodiment in question is suitable for reducing or minimizing said power gap.

Nevertheless, in this context, embodiments of the auto-ignition supercharged internal combustion engine may also be provided in which the line for exhaust-gas recirculation opens into the intake system downstream of the compressor of the at least one exhaust-gas turbocharger. Then, the recirculated exhaust gas is not conducted through the compressor of the exhaust-gas turbocharger. It is possible to dispense with exhaust-gas aftertreatment of the exhaust gas for recirculation, such as is generally necessary if the exhaust gas is conducted through the compressor. The turbine pressure ratio at the EGR turbine is lower than in the preceding embodiment, and corresponds to the compressor pressure ratio at the EGR compressor.

Here, embodiments of the auto-ignition supercharged internal combustion engine are provided in which the line for exhaust-gas recirculation opens into the intake system downstream of a charge-air cooler. In this way, the exhaust-gas flow is not conducted through the charge-air cooler, and, consequently, said cooler cannot be fouled by deposits of pollutants, in particular soot particles and oil, contained in the exhaust-gas flow.

Embodiments of the auto-ignition supercharged internal combustion engine are provided in which a charge-air cooler is provided in the intake system downstream of the compressor of the at least one exhaust-gas turbocharger.

Embodiments of the auto-ignition supercharged internal combustion engine are provided in which at least one exhaust-gas aftertreatment system is arranged in the line for exhaust-gas recirculation downstream of the EGR turbine, if the exhaust gas is conducted through the compressor of the at least one exhaust-gas turbocharger.

For reasons already stated above, embodiments of the auto-ignition supercharged internal combustion engine are provided in which the exhaust-gas turbocharger provided in the line for exhaust-gas recirculation is equipped with an auxiliary drive which, when indicated, can be activated for assistance purposes.

If the power provided by the EGR turbine is not sufficient for driving the EGR compressor, assistance is indicated, and the drive power provided for the EGR compressor may be increased using the auxiliary drive.

Here, embodiments of the auto-ignition supercharged internal combustion engine are provided in particular in which an electric auxiliary drive is provided, preferably an electric auxiliary drive which comprises a stator and a rotor, wherein the rotor of the electric auxiliary drive is arranged on the shaft of the exhaust-gas turbocharger.

The electric auxiliary drive in the form of an electric motor comprises a stator and a rotor. It is accordingly possible for an electric motor, that is to say an electric drive, to be formed with a rotatable rotor and with a stator which is arranged fixedly with respect to a housing, that is to say for example in the housing of the exhaust-gas turbocharger, which stator, manufactured preferably from a magnetic material, extends circumferentially around the rotor, which is formed in the manner of a wheel. When the stator, preferably a coil, is energized, an electromagnetic force is generated which rotates the rotor.

Therefore, embodiments are provided in which the stator comprises an energizable coil for generating a magnetic field, and embodiments are also provided in which the rotor comprises at least one permanent magnet for generating a magnetic field.

Embodiments may basically also be advantageous in which the rotor comprises an energizable coil for generating a magnetic field. By contrast to the preceding embodiment, in which the rotor comprises at least one permanent magnet, an energizable coil for generating a magnetic field requires a cyclic electrical supply to the rotating coil of the rotor, which necessitates a current reversal and therefore brushes. This type of an electric motor is more complex and has a greater space requirement, for which reason it is rather unsuitable, but is nevertheless basically an option, for the present usage with little structural space.

Embodiments of the auto-ignition supercharged internal combustion engine may also be provided in which the stator comprises at least one permanent magnet for generating a magnetic field. It is however then necessary for the rotor to comprise an energizable coil for generating a magnetic field.

Embodiments of the auto-ignition supercharged internal combustion engine may however also be provided in which a mechanical auxiliary drive is provided.

Here, embodiments of the auto-ignition supercharged internal combustion engine are provided in which the mechanical auxiliary drive is a traction mechanism drive which, aside from a traction mechanism, comprises a first, driving wheel arranged on a crankshaft and at least one further, second, driven wheel which is arranged on the shaft of the exhaust-gas turbocharger, the traction mechanism being guided around the driving first wheel and around the at least one further, second, driven wheel. The traction mechanism may be a belt or a chain.

Embodiments of the auto-ignition supercharged internal combustion engine are provided in which the exhaust-gas turbocharger provided in the line for exhaust-gas recirculation and the EGR cooler provided in the line for exhaust-gas recirculation form a structural unit, that is to say are at least partially formed integrally, and have for example a common housing. This permits dense packaging, and also simplifies the assembly of the internal combustion engine.

Embodiments of the auto-ignition supercharged internal combustion engine are provided in which a bypass line is provided for bypassing the exhaust-gas turbocharger arranged in the line for exhaust-gas recirculation. Under some circumstances, the recirculation of uncooled exhaust gas is preferred, for example after a cold start of the internal combustion engine. If the exhaust gas for recirculation is not to be cooled, or does not need to be cooled, it is also the case that no compression of the exhaust gas by means of the EGR compressor is necessary, and an expansion in the EGR turbine can be omitted.

In this context, embodiments of the auto-ignition supercharged internal combustion engine are therefore also provided in which the bypass line branches off from the exhaust-gas discharge system upstream of the EGR compressor and opens into the exhaust-gas discharge system downstream of the EGR turbine.

Embodiments of the auto-ignition supercharged internal combustion engine are provided in which only one exhaust-gas turbocharger is provided which comprises a turbine arranged in the exhaust-gas discharge system and a compressor arranged in the intake system.

The close-coupled arrangement of the turbine of the single exhaust-gas turbocharger is possible, and therefore the exhaust-gas enthalpy of the hot exhaust gases, which is determined significantly by the exhaust-gas pressure and the exhaust-gas temperature, may be utilized optimally, and a fast response behavior of the turbocharger can be ensured. A close-coupled arrangement shortens the path of the hot exhaust gases to the turbine, and also the volume of the exhaust-gas discharge system upstream of the turbine is reduced. The thermal inertia of the exhaust-gas discharge system likewise decreases, specifically owing to a reduction in the mass and length of the part of the exhaust-gas discharge system leading to the turbine.

The use of a single exhaust-gas turbocharger instead of multiple turbochargers is more advantageous in respect of the friction losses and the overall efficiency of the internal combustion engine. In addition, there is no need for a changeover between multiple exhaust-gas turbochargers or for activation and deactivation of an exhaust-gas turbocharger. This, too, proves to be advantageous with respect to the torque characteristic and prevents, in particular, a temporary drop in torque. The close-coupled arrangement of the turbine of the single exhaust-gas turbocharger allows for dense packaging of the drive unit as a whole.

When multiple exhaust-gas turbochargers are used, for example two-stage supercharging, the close-coupled arrangement of all turbines gives rise to problems out of principle.

Embodiments of the auto-ignition supercharged internal combustion engine may also nevertheless be provided in which at least two exhaust-gas turbochargers are provided, wherein each exhaust-gas turbocharger comprises a turbine arranged in the exhaust-gas discharge system and a compressor arranged in the intake system. The advantages which arise from the use of multiple exhaust-gas turbochargers have already been explained. Reference is made here to the relevant statements.

Embodiments of the auto-ignition supercharged internal combustion engine are provided in which the turbine of the at least one exhaust-gas turbocharger has a bypass line. Then, during an exhaust-gas flow-off, exhaust gas can be conducted past the turbine, as a result of which the turbine can be designed for relatively low or medium exhaust-gas flow rates. In this way, the torque characteristic in particular at low engine speeds or in the presence of relatively low exhaust-gas flow rates is noticeably improved. The sizing of the turbine for relatively low or medium exhaust-gas flow rates is expedient in the present case if exhaust gas is recirculated in not inconsiderable flow rates in extensive regions of the engine characteristic map.

Embodiments of the auto-ignition supercharged internal combustion engine are provided in which the turbine of the at least one exhaust-gas turbocharger has a variable turbine geometry.

The variable turbine geometry allows for extensive adaptation to the respective operating point by adjustment of the turbine geometry or of the effective turbine cross section. Here, guide blades for influencing the flow direction are arranged upstream of the at least one impeller of the turbine. In contrast to the impeller blades of the rotating impeller, the guide blades do not rotate with the shaft of the turbine, that is to say with the impeller. The guide blades are arranged so as to be stationary but not so as to be completely immovable, rather so as to be rotatable about their axis such that the flow approaching the impeller blades can be influenced.

In contrast, if the turbine has a fixed, invariable geometry, the guide blades are not only stationary but are also completely immovable, that is to say rigidly fixed, if a guide device is provided at all.

Embodiments of the auto-ignition supercharged internal combustion engine are provided in which the compressor belonging to the turbine of the at least one exhaust-gas turbocharger has a variable compressor geometry.

A variable compressor geometry has proven to be advantageous in particular if only a small exhaust-gas flow rate is conducted through the turbine because, by adjustment of the guide blades, the surge limit of the compressor in the compressor characteristic map can be shifted in the direction of small compressor flows, and thus the compressor is prevented from operating beyond the surge limit. The variable compressor geometry therefore also offers advantages if high exhaust-gas flow rates are to be recirculated in order to realize high recirculation rates. If the turbine of the at least one exhaust-gas turbocharger has a variable turbine geometry, the variable compressor geometry can be adapted continuously to the turbine geometry.

Embodiments of the auto-ignition supercharged internal combustion engine are provided in which a battery for storing electrical energy is provided. The electrical energy is required for providing a supply to, and for driving, an electric auxiliary drive that may be provided. Embodiments of the auto-ignition supercharged internal combustion engine are provided in which the compressor of the at least one exhaust-gas turbocharger is a radial compressor and the turbine of the at least one exhaust-gas turbocharger is a radial turbine. This permits dense packaging of the exhaust-gas turbocharger and thus of the supercharging arrangement as a whole.

Figure 4:
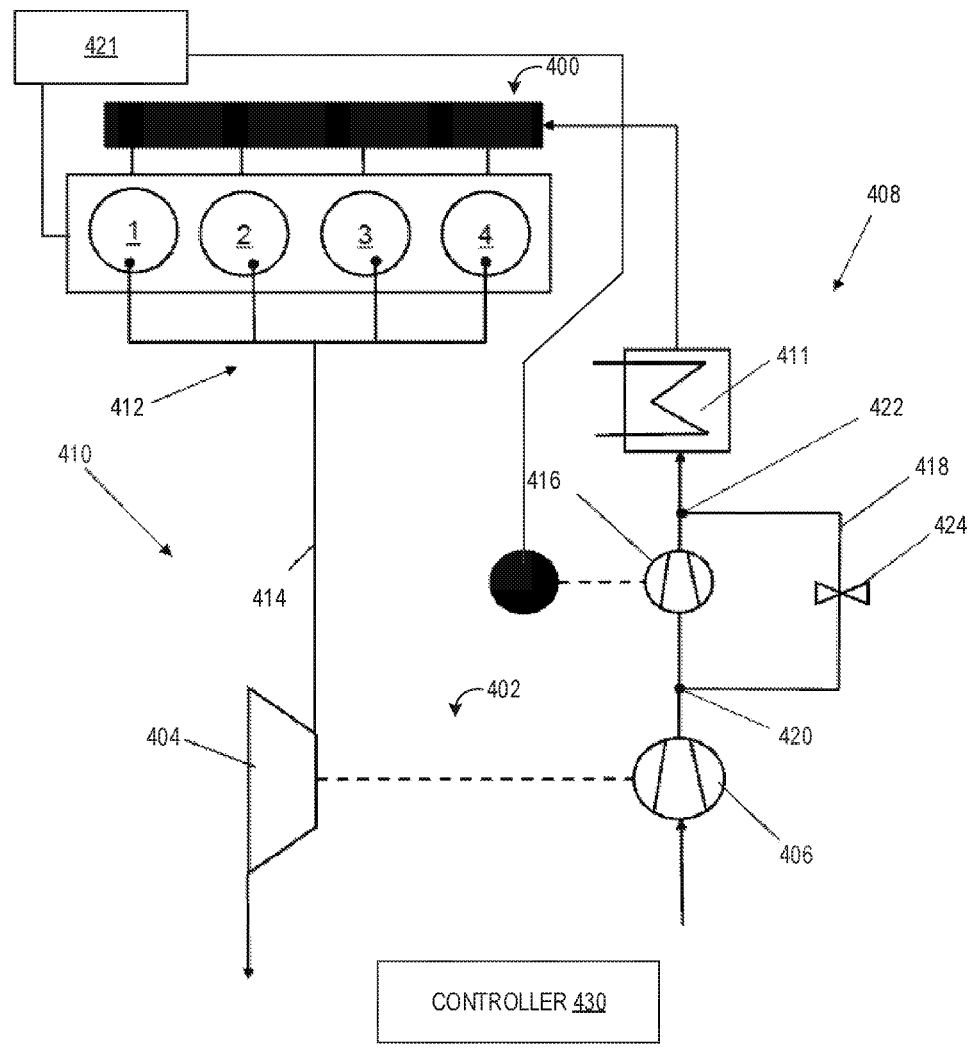
FIG. 4 schematically shows a second embodiment of an internal combustion engine.

FIGS. 1 and 4, described below, show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 schematically shows a first embodiment of the supercharged internal combustion engine 1. Said internal combustion engine is a four-cylinder in-line engine 1 in which the four cylinders are arranged along the longitudinal axis of the cylinder head, that is to say in a line. An intake system 2 is provided for the supply of charge air to the cylinders and an exhaust-gas discharge system 3 is provided for the discharge of exhaust gas from the cylinders.

For the purpose of supercharging, the internal combustion engine 1 is equipped with an exhaust-gas turbocharger 4 which comprises a first turbine 4a arranged in the exhaust-gas discharge system 3 and a first compressor 4b arranged in the intake system 2. The hot exhaust gas expands in the first turbine 4a with a release of energy to the shaft. The first compressor 4b, likewise arranged on the shaft, compresses the charge air which is supplied to the cylinders via the intake system 2, charge-air cooler 5 and plenum 10 (e.g., intake manifold), as a result of which the supercharging of the internal combustion engine 1 is realized. The charge-air cooler 5 is arranged downstream of the first compressor 4b.

The internal combustion engine 1 is furthermore equipped with an exhaust-gas recirculation arrangement 6 which comprises a line 6a which branches off from the exhaust-gas discharge system 3 and opens into the intake system 2. In the present case, the line 6a for exhaust-gas recirculation 6 branches off from the exhaust-gas discharge system 3 upstream of the first turbine 4a of the exhaust-gas turbocharger 4 and opens into the intake system 2 again upstream of the first compressor 4b of the exhaust-gas turbocharger 4.

In the line 6a for exhaust-gas recirculation 6 there is provided an exhaust-gas recirculation (EGR) turbocharger 8 which comprises a second, EGR turbine 8a, arranged in the line 6a, and a second, EGR compressor 8b, arranged in the line 6a upstream of said EGR turbine 8a. An EGR cooler 7 is provided between the EGR turbine 8a and the EGR compressor 8b. An EGR valve 6c is arranged in the line 6a for exhaust-gas recirculation 6 downstream of the EGR turbine 8a, by means of which EGR valve the recirculation rate can be adjusted.

The EGR turbocharger 8 provided in the exhaust-gas recirculation arrangement 6 is equipped with an activatable electric auxiliary drive 9 which comprises a stator and a rotor, wherein the rotor of the electric auxiliary drive 9 is arranged on the shaft of the EGR turbocharger 8.

The engine system may further include a control system. The control system may include a controller 112. The controller 112 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 1, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 112 from signal PIP.

Storage medium read-only memory 106 can be programmed with computer readable data representing instructions executable by processor 102 for performing the methods described below as well as other variants that are anticipated but not specifically listed. Example methods are described with reference to FIG. 2.

The controller 112 receives signals from the various sensors of FIG. 1 and employs the various actuators of FIG. 1 to adjust engine operation based on the received signals and instructions stored on a memory of the controller. For example, in order to control EGR flow, the controller may receive signals from various sensors indicating engine speed and load, and the controller may adjust an actuator of the EGR valve based on the received signals such that a designated amount of EGR is provided to the engine. To drive the EGR compressor during conditions where sufficient power is not generated the by the EGR turbine, the controller may receive signals from various sensors indicating exhaust gas mass flow, EGR compressor or turbine ratio, etc., and activate the motor of the electric auxiliary drive.

In some examples, a belt integrated starter-generator (BISG) system 11 may be coupled to engine 1. The BISG system 11 may include a starter-generator motor coupled to a battery and coupled to the engine via a belt. In one example, the starter-generator motor may be a 48 volt motor and the battery may be a 48 volt battery. A DC-DC converter may convert the 48 V output from the motor to 12 V for usage in a subset of the vehicle's electrical components. The electric auxiliary drive 9 may be powered by the 48 V BISG system 11. As such, in some examples, when the electric auxiliary drive 9 is activated (e.g., the coil is energized), the motor torque of the motor of the BISG may be adjusted.

Figure 2:
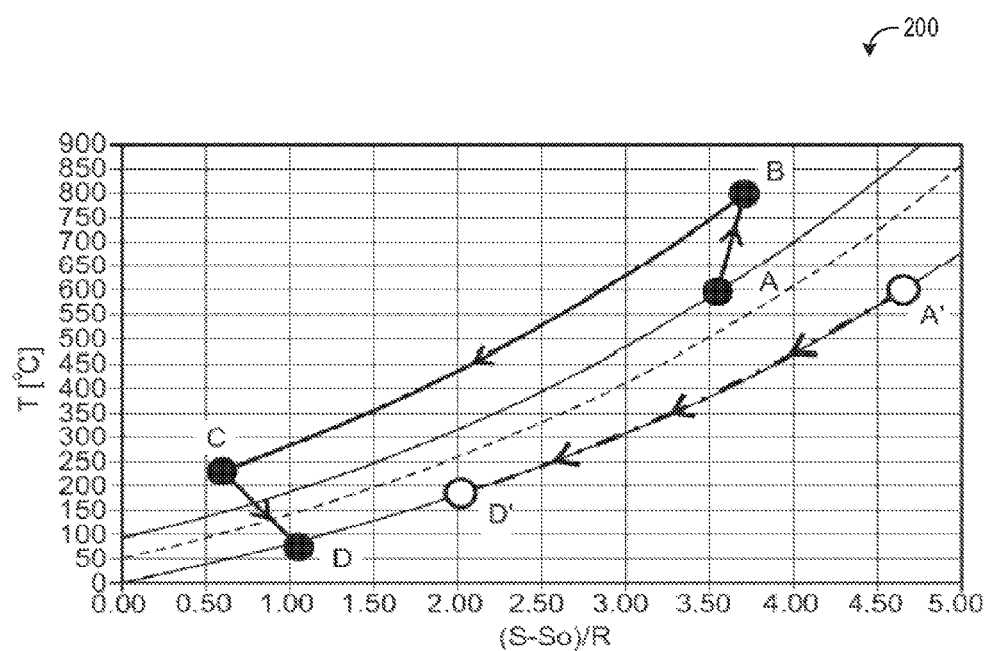
FIG. 2 shows, in a diagram, the compression, the cooling and the expansion of the exhaust gas in the context of the exhaust-gas recirculation arrangement of the internal combustion engine illustrated in FIG. 1.

FIG. 2 shows, in a diagram 200, the compression (A to B), the cooling (B to C) and the expansion (C to D) of the exhaust gas in the context of the exhaust-gas recirculation and cooling according to the disclosure in the case of the internal combustion engine illustrated in FIG. 1, wherein the temperature in ° C. is plotted on the ordinate and the entropy S in relation to the gas constant R is plotted on the abscissa. For comparison, conventional cooling (A' to D') in the context of an isobaric exhaust-gas recirculation arrangement is illustrated.

The cooling (A to D) of the exhaust gas for recirculation leads to significantly lower exhaust-gas temperatures in relation to conventional cooling without compression and expansion (A' to D'). Whereas it is the case in state D that the exhaust gas is at a temperature of less than 85° C., an exhaust-gas temperature of over 180° C. prevails in state D'. The approach according to the disclosure thereby ensures high exhaust-gas recirculation rates.

Figure 3:
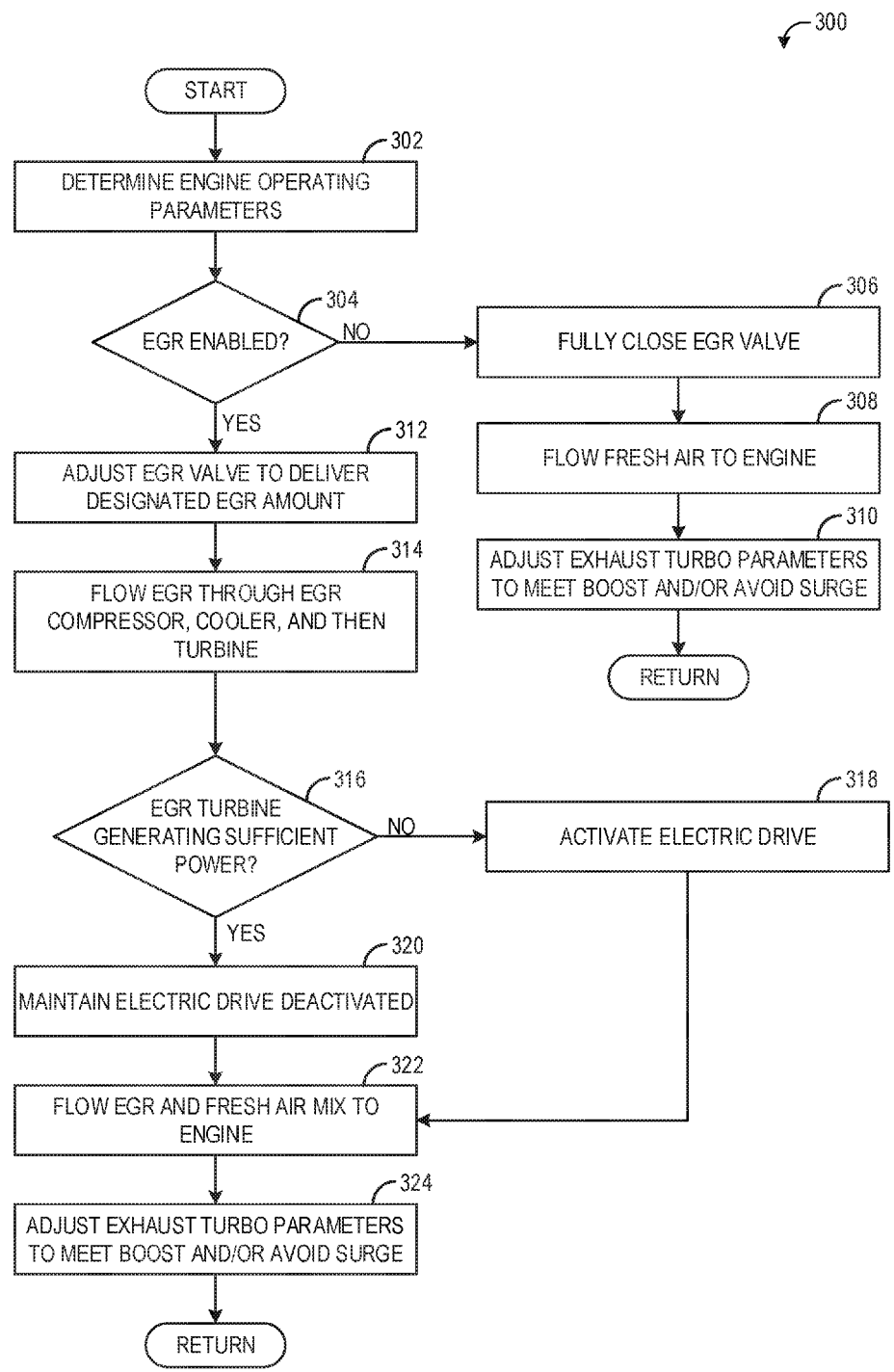
FIG. 3 is a flow chart illustrating a method for operating the engine of FIG. 1.

FIG. 3 is a flow chart illustrating a method 300 for operating an engine, such as engine 1 of FIG. 1, using high exhaust gas recirculation rates. Instructions for carrying out method 300 and the rest of the methods included herein may be executed by a controller (such as controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, method 300 includes determining engine operating parameters. The determined operating parameters include, but are not limited to, engine speed, engine load, engine temperature, etc. At 304, method 300 determines if exhaust gas recirculation (EGR) is enabled. EGR may be enabled during most engine operating conditions, but may be disabled during certain conditions that exhibit relatively high combustion instability, such as very lean air-fuel ratio conditions, low speed or load conditions, or the like.

If EGR is enabled, method 300 proceeds to 312, which will be explained in more detail below. If EGR is not enabled, method 300 proceeds to 306 to fully close an EGR valve present in an EGR passage. For example, with respect to the engine configuration of FIG. 1, an EGR valve 6c in EGR line 6a may be fully closed to prevent flow of exhaust gas to the intake. Due to the closed EGR valve, no exhaust gas flows through the EGR turbine or EGR compressor positioned in the EGR line, and the electric auxiliary drive is deactivated. At 308, method 300 includes flowing fresh air (and not EGR) to the engine for combustion. At 310, method 300 optionally includes adjusting one or more exhaust turbocharger parameters to meet boost and/or avoid surge, such as exhaust gas turbine or compressor geometry, turbine or compressor bypass valve position, etc. Method 300 then returns.

Returning to 304, if it is determined that EGR is enabled, method 300 proceeds to 312 to adjust the EGR valve to deliver a designated EGR amount. The EGR valve may be adjusted based on engine speed and load, for example. At 314, method 300 includes flowing EGR through the EGR compressor, the EGR cooler, and then the EGR turbine. For example, as explained above with respect to FIG. 1, an EGR turbocharger may be present in the EGR line, and when exhaust gas flows through the EGR line, the exhaust gas first is compressed by the EGR compressor 8b and then is cooled by the EGR cooler 7 before expanding in the EGR turbine 8a. The EGR compressor is driven by the EGR turbine, and due to the configuration of the EGR turbocharger (e.g., that the exhaust first travels through the EGR compressor and EGR cooler before flowing through the EGR turbine), during some conditions, a power gap may be present where insufficient exhaust energy is available to drive the EGR turbine to match the power of the EGR compressor. To mitigate the power gap, an electric auxiliary drive (e.g., electric auxiliary drive 9 of FIG. 1) may be coupled to the shaft of the EGR turbocharger in order to drive the compressor during the power gap conditions.

Accordingly, at 316, method 300 includes determining if the EGR turbine is generating sufficient power. In one example, the power generation of the EGR turbine may be determined based on a rotational speed of the shaft coupling the EGR turbine to the EGR compressor, for example as measured by a speed sensor. If the shaft speed is lower than a threshold, it may be determined that the EGR turbine is not generating sufficient power. In another example, the power generation of the EGR turbine may be determined by a pressure ratio across the EGR turbine or a pressure ratio across the EGR compressor, which may be determined based on pressure sensor readings of pressure sensors located upstream and/or downstream of the EGR compressor and/or EGR turbine. If the pressure ratio is less than a threshold ratio, it may be determined that the EGR turbine is not generating sufficient power. In a further example, it may be determined that the EGR turbine is not generating sufficient power when engine speed and/or engine load are relatively low (e.g., a load of 25% or less of maximum rated load, idle engine speed, etc.).

If the EGR turbine is not generating sufficient power, method 300 proceeds to 318 to activate the electric auxiliary drive, which may include coupling a voltage source to a coil of the drive to energize the coil and hence rotate a rotor of the drive, thus rotating the shaft of the EGR turbocharger. If the EGR turbine is generating sufficient power, method 300 proceeds to 320 to maintain the electric drive deactivated, and the EGR compressor is solely driven by the EGR turbine.

At 322, method 300 includes flowing an EGR and fresh air mix to the engine for combustion. The relative proportion of EGR to fresh air may be based on the position of the EGR valve. Further, in some examples, the EGR may mix with the fresh air upstream of a compressor of the exhaust gas turbocharger, and hence the EGR may be re-compressed after expanding in the EGR turbine, and then re-cooled via the charge air cooler. By first flowing the EGR through the EGR turbocharger and EGR cooler, the EGR may be cooled to a high degree, allowing relatively high EGR rates, such as 60-85%.

At 324, method 300 optionally includes adjusting one or more exhaust turbocharger parameters to meet boost and/or avoid surge, such as exhaust gas turbine or compressor geometry, turbine or compressor bypass valve position, etc. In one example, the exhaust gas turbine or compressor geometry or turbine or compressor bypass valve position may be adjusted differentially when EGR is flowing relative to when EGR is not flowing, and may be adjusted differentially during high EGR rate conditions (e.g., EGR rates higher than 50%) relative to lower EGR rate conditions (e.g., EGR rates lower than 50%). Method 300 then returns.

In this way, a standard exhaust gas turbocharger may be provided in the engine system to provide boost for increasing engine power, while an electrically-assisted EGR turbocharger may be provided in the EGR system to increase EGR cooling. The EGR is first boosted (e.g., compressed) by the EGR compressor to a high pressure (e.g., higher than engine-out exhaust pressure) and then is cooled in the EGR cooler. Finally, the EGR is expanded in the EGR turbine, further cooling the EGR prior to the EGR mixing with the fresh air in the intake system. To compress the EGR to the high pressure, additional power may be provided by the electric assist. By doing so, extreme EGR cooling (e.g., below a temperature of the coolant in the EGR cooler) may be provided while using a compact EGR cooler, and a relatively small amount of power may be consumed by the electric assist (e.g., relative to engine brake power). Accordingly, very high EGR rates may be provided to the engine, thus lowering NOx emissions.

The electric assist system described above may be used to provide additional power when needed to drive the compressor in the EGR system. However, the compressor in the intake system may unable to meet boost demand during all conditions, and thus it may be beneficial to include an electric assist compressor (also referred to as an e-booster) in the intake system. The e-booster may be positioned downstream of the main compressor, which would allow for the e-booster to be sized relatively small. An alternative location upstream of the compressor would be suitable, although the e-booster may be relatively larger when positioned therein.

The e-booster may be activated when switching from fully active cylinder mode to deactivated cylinder mode, where one or more cylinders of the engine are deactivated, to support the additional boost demand, which may not be delivered by the exhaust gas turbocharger alone. Once the system runs in stable deactivated mode, the available energy on the turbine and required energy on the compressor will be balanced and the e-booster can be smoothly switched off again. When the e-booster is deactivated a bypass would be beneficial to avoid unnecessary pressure drop in the air path.

Cylinder deactivation may improve engine efficiency by dethrottling the engine (at least in spark-ignited engines, also referred to as Otto-cycle engines). Cylinder deactivation includes the deactivation of individual cylinders in certain load ranges. The efficiency of the Otto-cycle engine in part-load operation can be improved, that is to say increased, by means of a partial deactivation, because the deactivation of one cylinder of a multi-cylinder internal combustion engine increases the load on the other cylinders, which remain in operation, if the engine power remains constant, such that the throttle flap can or must be opened further in order to introduce a greater air mass into said cylinders, whereby dethrottling of the internal combustion engine is attained overall. During the partial deactivation, the cylinders which are permanently in operation furthermore operate in the region of higher loads, at which the specific fuel consumption is lower. The load collective is shifted toward higher loads.

The cylinders which remain in operation during the partial deactivation furthermore exhibit improved mixture formation owing to the greater air mass or mixture mass supplied. Further advantages with regard to efficiency are attained in that a deactivated cylinder, owing to the absence of combustion, does not generate any wall heat losses owing to heat transfer from the combustion gases to the combustion chamber walls.

Even though diesel engines, that is to say auto-ignition internal combustion engines, owing to the quality regulation on which they are based, exhibit greater efficiency, that is to say lower fuel consumption, than Otto-cycle engines in which the load—as described above—is adjusted by means of throttling or quantity regulation with regard to the charging of the cylinders, there is, even in the case of diesel engines, potential for improvement and a demand for improvement with regard to fuel consumption and efficiency.

One concept for reducing fuel consumption, also in the case of diesel engines, is cylinder deactivation, that is to say the deactivation of individual cylinders in certain load ranges. The efficiency of the diesel engine in part-load operation can be improved, that is to say increased, by means of a partial deactivation, because, even in the case of the diesel engine, in the case of constant engine power the deactivation of at least one cylinder of a multi-cylinder internal combustion engine increases the load on the other cylinders still in operation, such that said cylinders operate in regions of higher loads, in which the specific fuel consumption is lower. The load collective in part-load operation of the diesel engine is shifted toward higher loads.

With regard to the wall heat losses, the same advantages are attained as in the case of the Otto-cycle engine, for which reason reference is made to the corresponding statements given. In the case of diesel engines, the partial deactivation is also intended to prevent the fuel-air mixture from becoming too lean as part of the quality regulation in the event of decreasing load as a result of a reduction of the fuel quantity used.

If, for the purpose of the partial deactivation, the fuel supply to the deactivatable cylinders is stopped, that is to say discontinued, the deactivated cylinders continue to participate in the charge exchange if the associated valve drive of said cylinders is not deactivated or cannot be deactivated. The charge exchange losses thus generated lessen, and counteract, the improvements achieved with regard to fuel consumption and efficiency by means of the partial deactivation, such that the benefit of the partial deactivation is at least partially lost, that is to say the partial deactivation in fact yields an altogether less pronounced improvement.

To remedy the disadvantageous effects described above, it may be expedient for switchable or adjustable valve drives to be provided at the inlet side and at the outlet side, by means of which valve drives the deactivated cylinders are held closed, and thus no longer participate in the charge exchange, during the partial deactivation. In this way, a situation is also prevented in which the relatively cool charge air conducted through the deactivated cylinders reduces the enthalpy of the exhaust-gas flow provided to the turbine and causes the deactivated cylinders to rapidly cool down.

However, in the case of internal combustion engines supercharged by means of exhaust-gas turbocharging, such as the internal combustion engines described herein, switchable valve drives can lead to further problems because the turbine of an exhaust-gas turbocharger is configured for a certain exhaust-gas flow rate, and thus generally also for a certain number of cylinders. If the valve drive of a deactivated cylinder is deactivated, the total mass flow through the cylinders of the internal combustion engine is initially reduced. The exhaust-gas mass flow conducted through the turbine decreases, and the turbine pressure ratio generally also decreases as a result. A decreasing turbine power has the result that the charge pressure ratio likewise decreases, that is to say the charge pressure falls.

It may be necessary for the charge pressure to be increased in order to supply more charge air to the cylinders that remain operational, because in the event of deactivation of at least one cylinder of a multi-cylinder internal combustion engine, the load on the other cylinders, which remain operational, increases, for which reason a greater amount of charge air and a greater amount of fuel must be supplied to said cylinders. The drive power available at the compressor for generating an adequately high charge pressure is dependent on the exhaust-gas enthalpy of the hot exhaust gases, which is determined significantly by the exhaust-gas pressure and the exhaust-gas temperature, and the exhaust-gas mass or the exhaust-gas flow.

In the case of Otto-cycle engines, by opening the throttle flap, the charge pressure can be easily increased in the load range relevant for partial deactivation. This possibility does not exist in the case of the diesel engine. The small charge-air flow may have the effect that the compressor operates beyond the surge limit.

The effects described above lead to a restriction of the practicability of the partial deactivation, specifically to a restriction of the engine speed range and of the load range in which the partial deactivation can be used. In the case of low charge-air flow rates, it is not possible, owing to inadequate compressor power or turbine power, for the charge pressure to be increased in accordance with demand.

The charge pressure during a partial deactivation, and thus the charge-air flow rate supplied to the cylinders that remain operational, could for example be increased by means of a small configuration of the turbine cross section and by means of simultaneous exhaust-gas blow-off, whereby the load range relevant for a partial deactivation would also be expanded again. This approach however has the disadvantage that the supercharging behavior is inadequate when all the cylinders are operated.

The charge pressure during partial deactivation, and thus the charge-air flow rate supplied to the cylinders that are still operational, could also be increased by virtue of the turbine being equipped with a variable turbine geometry, which permits an adaptation of the effective turbine cross section to the present exhaust-gas flow. The exhaust-gas back pressure in the exhaust-gas discharge system upstream of the turbine would then however simultaneously increase, leading in turn to higher charge-exchange losses in the cylinders that are still operational.

Some engines may be equipped with multiple turbines of relatively small turbine cross section arranged in parallel, wherein, with increasing load, not only cylinders but, together with the cylinders, also turbines are activated in succession, similarly to a sequential supercharging arrangement. The torque characteristic of the supercharged, partially deactivatable internal combustion engine can be improved in this way, wherein the use of multiple chargers or turbines is always afflicted with the disadvantage of increased friction losses, and multiple turbochargers have poorer overall efficiency than a single exhaust-gas turbocharger. Furthermore, if multiple exhaust-gas turbochargers are used, the costs and space requirement of the supercharging arrangement are considerably increased.

Thus, according to embodiments disclosed herein, an e-booster may be present in the intake system to provide additional boosting during cylinder deactivation. In one example, a supercharged internal combustion engine is provided having at least one cylinder head comprising at least three cylinders, where each cylinder has at least one inlet opening which is adjoined by an intake line for the supply of charge air via an intake system, each cylinder has at least one outlet opening which is adjoined by an exhaust line for discharging the exhaust gases via an exhaust-gas discharge system, at least one exhaust-gas turbocharger is provided, the exhaust-gas turbocharger comprising a turbine arranged in the exhaust-gas discharge system and a compressor arranged in the intake system, and at least one exhaust-gas recirculation arrangement is provided. The at least three cylinders are configured in such a way that they form at least two groups with in each case at least one cylinder, the at least one cylinder of a first group being a cylinder which is operational even in the event of a partial deactivation of the internal combustion engine, and the at least one cylinder of a second group being formed as a load-dependently switchable cylinder, and the exhaust lines of the at least three cylinders merge, with the formation of an exhaust manifold, to form an overall exhaust line which is connected to the turbine of the at least one exhaust-gas turbocharger. The internal combustion engine includes an electrically driveable compressor is arranged in the intake system, said electrically driveable compressor being connectable in series with the compressor of the at least one exhaust-gas turbocharger, and a bypass line being provided for the purposes of bypassing said electrically driveable compressor, which bypass line branches off from the intake system, with the formation of a first junction point, upstream of the electrically driveable compressor and opens into the intake system, with the formation of a second junction point, downstream of the electrically driveable compressor.

The exhaust-gas-turbocharged internal combustion engine according to the disclosure is equipped with an additional compressor which, in the present case, is an electrically driveable compressor, such that no mechanical connection for power transmission exists, or is required, between the compressor and internal combustion engine. The electrically driveable compressor is consequently distinguished by a small space requirement. This permits dense packaging of the supercharging arrangement and thus of the internal combustion engine.

A further advantage of the electrically driveable compressor consists in that the electrically driveable compressor—by contrast to the exhaust-gas turbocharger—can generate and provide the demanded charge pressure independently of the present operating state of the internal combustion engine, in particular even in the presence of low exhaust-gas flow rates or at low rotational speeds of the crankshaft.

According to the disclosure, the electrically driveable compressor is designed as an activatable compressor which is activated upon demand, specifically upon the transition to partial deactivation, for the purposes of assisting the compressor of the at least one exhaust-gas turbocharger in order to contribute to the compression of the charge air or cooperate in the generation of the required charge pressure.

As already discussed, upon a partial deactivation of the internal combustion engine, the charge pressure is increased in order that more charge air can be supplied to those cylinders which remain operational, the loading of which increases in the operating mode of partial deactivation.

The drive power which is available at the compressor of the exhaust-gas turbocharger for generating the charge pressure is dependent on the exhaust-gas enthalpy of the hot exhaust gases and on the total mass flow through the cylinders of the internal combustion engine, whereby the compressor power cannot be readily increased in accordance with demand upon the transition to partial deactivation. The electrically driveable compressor closes this gap that arises from the excessively low turbine power or compressor power of the exhaust-gas turbocharger.

Upon the transition to partial deactivation, the charge air is, using the electrically driveable compressor and the compressor of the at least one exhaust-gas turbocharger, compressed in two-stage fashion, whereby the charge pressure can be increased. In this way, more charge air can be, and is, supplied to the cylinders that remain operational. The total mass flow through the cylinders of the internal combustion engine is increased, and thus the exhaust-gas flow through the turbine of the at least one exhaust-gas turbocharger is also increased. The turbine power and thus the available compressor power of the exhaust-gas turbocharger increase. After a transition phase, the compressor of the at least one exhaust-gas turbocharger is, even without assistance, capable of generating the demanded charge pressure in the intake system downstream of the compressors.

The electrically driveable compressor is deactivated as soon as the partially deactivated internal combustion engine is running in stable fashion, that is to say when the demand situation described above no longer exists.

The electrically driveable compressor may also be used during normal operation of the internal combustion engine in order to improve the torque characteristic at low engine speeds or in the presence of low exhaust-gas flow rates.

With the internal combustion engine according to the disclosure, an internal combustion engine is provided which is further optimized with regard to its torque characteristic and the partial deactivation.

The internal combustion engine according to the disclosure has at least three cylinders or at least two groups with in each case at least one cylinder. In this respect, internal combustion engines with three cylinders which are configured in three groups with in each case one cylinder, or internal combustion engines with six cylinders which are configured in three groups with in each case two cylinders, are likewise internal combustion engines according to the disclosure. Within the context of a partial deactivation, the three cylinder groups may be activated or deactivated in succession, whereby two-time switching may also be realized. The partial deactivation is thereby further optimized. The cylinder groups may also comprise a different number of cylinders.

According to the disclosure, at least one exhaust-gas recirculation arrangement is provided which comprises a recirculation line which branches off from the exhaust-gas discharge system and issues into the intake system.

Exhaust-gas recirculation, that is to say the recirculation of combustion gases, is a suitable means for reducing the nitrogen oxide emissions, wherein it is possible for the nitrogen oxide emissions to be considerably reduced with increasing exhaust-gas recirculation rate. Here, the exhaust-gas recirculation rate xEGR is determined as xEGR=mEGR/(mEGR+mfresh air), where mEGR denotes the mass of recirculated exhaust gas and mfresh air denotes the supplied fresh air which, if appropriate, is conducted through a compressor and compressed. To obtain a considerable reduction in nitrogen oxide emissions, high exhaust-gas recirculation rates are required which may be of the order of magnitude of xEGR≈60% to 70%.

Here, embodiments of the supercharged internal combustion engine are provided in which a shut-off element for adjusting the recirculated exhaust-gas flow rate is arranged in the recirculation line of the exhaust-gas recirculation arrangement.

In the case of supercharged internal combustion engines having at least one exhaust-gas turbocharger and an exhaust-gas recirculation arrangement, embodiments are provided in which the recirculation line of the exhaust-gas recirculation arrangement branches off from the exhaust-gas discharge system upstream of the turbine of the at least one exhaust-gas turbocharger and opens into the intake system preferably downstream of the compressor or compressors. In the case of said so-called high-pressure EGR arrangement, the exhaust gas is extracted from the exhaust-gas discharge system upstream of the turbine and is fed into the intake system downstream of the compressor, whereby the exhaust gas need not be subjected to exhaust-gas aftertreatment, in particular supplied to a particle filter, before being recirculated, because there is no risk of fouling of the compressor or compressors.

In the case of the operation of an internal combustion engine with exhaust-gas turbocharging and the simultaneous use of high-pressure EGR, a conflict may however arise because the recirculated exhaust gas is no longer available for driving the turbine. In the event of an increase in the exhaust-gas recirculation rate, the exhaust-gas flow introduced into the turbine decreases. The reduced exhaust-gas mass flow through the turbine leads to a lower turbine pressure ratio, as a result of which the charge-pressure ratio or the charge pressure likewise falls.

One solution to this is so-called low-pressure EGR. By contrast to high-pressure EGR, in the case of low-pressure EGR, exhaust gas which has already flowed through the turbine is introduced into the intake system. For this purpose, the low-pressure EGR arrangement has a recirculation line which branches off from the exhaust-gas discharge system downstream of the turbine and issues into the intake system preferably upstream of the compressor or compressors.

Embodiments of the supercharged internal combustion engine may therefore be provided in which a low-pressure EGR arrangement is provided instead of a high-pressure EGR arrangement or in addition to a high-pressure EGR arrangement.

Embodiments of the supercharged internal combustion engine are provided in which the at least one bypass line is equipped with a shut-off element. By being opened, said shut-off element allows the electrically driveable compressor to be bypassed and thus deactivated, if it is sought to realize single-stage compression or supercharging using the exhaust-gas turbocharger. By means of said shut-off element, it is however also possible for the charge-air quantity supplied to the electrically driveable compressor to be controlled, that is to say adjusted. This is of relevance in particular in that phase of the operation of the internal combustion engine in which the electrically driveable compressor is, or is to be, deactivated again.

Embodiments of the supercharged internal combustion engine are provided in which a charge-air cooler is arranged in the intake system downstream of the compressors. The charge-air cooling arrangement lowers the temperature and increases the density of the compressed charge air and thus contributes to a further compression and improved charging of the operational cylinders. A bypass line for bypassing the charge-air cooler may be used, for example, after a cold start.

Embodiments of the supercharged internal combustion engine are provided in which the electrically driveable compressor is arranged in the intake system downstream of the compressor of the at least one exhaust-gas turbocharger.

Here, embodiments of the supercharged internal combustion engine are provided in which the bypass line branches off from the intake system, with the formation of a first junction point, between the electrically driveable compressor and the compressor of the at least one exhaust-gas turbocharger. Then, the bypass line serves exclusively for the bypassing of the electrically driveable compressor.

In this context, embodiments of the supercharged internal combustion engine are provided in which a further charge-air cooler is provided which is arranged in the intake system between the electrically driveable compressor and the first junction point. Then, the bypass line serves for the bypassing of the electrically driveable compressor.

In this context, embodiments of the supercharged internal combustion engine may also be provided in which a further charge-air cooler is provided which is arranged in the intake system between the compressor of the at least one exhaust-gas turbocharger and the first junction point. Then, the bypass line serves for the bypassing of the electrically driveable compressor, but no longer for the bypassing of the further charge-air cooler.

In the two latter embodiments, a further charge-air cooler is arranged between the compressors, that is to say between the compressor of the at least one exhaust-gas turbocharger and the electrically driveable compressor, which further charge-air cooler, in the context of a two-stage compression, lowers the temperature of the pre-compressed charge air between the compressors and thus increases the density of the charge air before it enters the electrically driveable compressor situated downstream. In this way, the compression in the electrically driveable compressor is improved, and the outlet temperature from said compressor is lowered, with the same overall pressure ratio of the supercharging group being maintained. It is however also possible for the overall pressure ratio of the compressor group, and thus the charge pressure, to be increased. In any case, the further charge-air cooler contributes to improved charging of the operational cylinders.

Embodiments of the supercharged internal combustion engine are likewise provided in which the electrically driveable compressor is arranged in the intake system upstream of the compressor of the at least one exhaust-gas turbocharger.

If the electrically driveable compressor is arranged not downstream but upstream of the compressor of the at least one exhaust-gas turbocharger, said compressor serves, in the context of a two-stage compression, as a low-pressure stage and not as a high-pressure stage.

Here, embodiments of the supercharged internal combustion engine are provided in which the bypass line opens into the intake system, with the formation of a second junction point, between the electrically driveable compressor and the compressor of the at least one exhaust-gas turbocharger. Then, the bypass line serves exclusively for the bypassing of the electrically driveable compressor.

In this context, embodiments of the supercharged internal combustion engine are provided in which a further charge-air cooler is provided which is arranged in the intake system between the electrically driveable compressor and the second junction point. Then, the bypass line serves for the bypassing of the electrically driveable compressor.

In this context, embodiments of the supercharged internal combustion engine may also be provided in which a further charge-air cooler is provided which is arranged in the intake system between the compressor of the at least one exhaust-gas turbocharger and the second junction point. Then, the bypass line serves for the bypassing of the electrically driveable compressor, but no longer for the bypassing of the further charge-air cooler.

That which has already been stated in conjunction with the further charge-air cooler applies analogously, for which reason reference is made to the corresponding statements.

Embodiments of the supercharged internal combustion engine are provided in which the turbine of the at least one exhaust-gas turbocharger has a fixed turbine geometry. A fixed turbine geometry is inexpensive. For a satisfactory torque characteristic, it may be advantageous for the turbine to be designed as a wastegate turbine. Embodiments of the supercharged internal combustion engine are also provided in which the turbine of the at least one exhaust-gas turbocharger has a variable turbine geometry. In particular, the combination of turbine with variable turbine geometry and compressor with variable compressor geometry makes it possible to achieve high charge pressures even in the presence of very low exhaust-gas flow rates. Embodiments of the supercharged internal combustion engine are provided in which the compressor of the at least one exhaust-gas turbocharger has a variable compressor geometry.

Embodiments of the supercharged internal combustion engine are provided in which the electrically driveable compressor is sized to be smaller than the compressor of the at least one exhaust-gas turbocharger. This is advantageous in particular in embodiments in which the electrically driveable compressor is arranged in the intake system downstream of the compressor of the at least one exhaust-gas turbocharger and serves as high-pressure stage in the context of a two-stage compression.

Embodiments of the supercharged internal combustion engine are provided in which only one standard exhaust-gas turbocharger is provided. Then, it is generally the case that single-stage supercharging or compression takes place during the normal operation of the internal combustion engine. With regard to friction losses and overall efficiency, it is more advantageous to use a single exhaust-gas turbocharger than multiple turbochargers, for which reason the above embodiment has advantages in terms of efficiency.

In the case of internal combustion engines having four cylinders in an in-line arrangement, embodiments are provided in which the two outer cylinders and the two inner cylinders form in each case one group.

In an example, a method for operating an internal combustion engine having only one exhaust-gas turbocharger includes, during the course of a transition to an operating mode of partial deactivation in which the at least one switchable cylinder of the second group is deactivated, activating the electrically driveable compressor for the purposes of assisting the compressor of the exhaust-gas turbocharger in order to generate an adequately high predefinable charge pressure in the intake system downstream of the compressors.

That which has already been stated with regard to the internal combustion engine according to the disclosure also applies to the method according to the disclosure, for which reason reference is generally made at this juncture to the statements made above with regard to the internal combustion engine. The different internal combustion engines require, in part, different method variants.

Embodiments of the method are provided in which the electrically driveable compressor is deactivated as soon as the operating mode of partial deactivation of the partially deactivated internal combustion engine is stable such that the compressor of the exhaust-gas turbocharger is capable, without assistance, of providing an adequately high pre-definable charge pressure in the intake system downstream of the compressors.

FIG. 4 schematically shows an embodiment of a super-charged internal combustion engine 400, which is equipped with an exhaust-gas turbocharger 402 which comprises a turbine 404 arranged in an exhaust-gas discharge system 410 and a compressor 406 arranged in the intake system 408. The hot exhaust gas expands in the turbine 404 with a release of energy. The compressor 406 compresses the charge air which is supplied to the cylinders of the engine via the intake system 408 and charge-air cooler 411, as a result of which supercharging of the internal combustion engine 400 is realized.

Said internal combustion engine is a four-cylinder in-line engine 400 in which four cylinders are arranged along the longitudinal axis of the cylinder head, that is to say in a line. The four cylinders are configured so as to form two groups with in each case two cylinders, wherein the two inner cylinders form a second group, the cylinders of which are in the form of load-dependently switchable cylinders which are deactivated during the course of a partial deactivation. The two outer cylinders form a first group, the cylinders of which are operational even during partial deactivation.

The exhaust lines of the cylinders merge to form an overall exhaust line 414, thus forming an exhaust manifold 412. The overall exhaust line 414 leads to the turbine 404 of the exhaust-gas turbocharger 402.

An electrically driveable compressor 416 is additionally arranged in the intake system 408, which compressor can be connected in series with the compressor 406 of the exhaust-gas turbocharger 402. The electrically driveable compressor 416 is designed as an activatable compressor which can be activated upon demand, specifically upon the transition to partial deactivation, for the purposes of assisting the compressor 406 of the exhaust-gas turbocharger 402 in order to be able to supply sufficient charge air to the cylinders that remain operational.

In the present case, the electrically driveable compressor 416 is arranged in the intake system 408 downstream of the compressor 406 of the exhaust-gas turbocharger 402, wherein, for the purposes of bypassing the electrically driveable compressor 416, a bypass line 418 is provided which branches off from the intake system 408, with the formation of a first junction point 420, between the electrically driveable compressor 416 and the compressor 406 of the exhaust-gas turbocharger 402 and opens into the intake system 408, with the formation of a second junction point 422, downstream of the electrically driveable compressor 416. A shut-off element 424 may be present in bypass line 418 to control flow of intake air around electrically drivable compressor 416.

The engine 400 described above may in some examples include an EGR system, where exhaust gas from the engine is recirculated to the intake. The EGR system may include an EGR line that is coupled to the exhaust system upstream of turbine 404 and is coupled to the intake system downstream of compressor 406, also known as high-pressure EGR. In other examples, the EGR system may additionally or alternatively include low-pressure EGR wherein the EGR line is coupled to the exhaust system downstream of turbine 404 and is coupled to the intake system upstream of compressor 406. Further, in some examples, the EGR system of FIG. 1 may be included in engine 400. In such a configuration, the EGR line is coupled to the exhaust system upstream of turbine 404, includes an EGR turbocharger and EGR cooler to cool the EGR, and is also coupled to the intake system. The EGR line in such an example may be coupled upstream of compressor 406, intermediate compressor 406 and electrically drivable compressor 416, or downstream of electrically drivable compressor 416. In such an example, the electrically drivable compressor 416 may be able to provide suitable compression during conditions where small exhaust volumes are available to drive the turbine 404, such as when high EGR rates are present (and hence a large amount of exhaust is diverted to the EGR system rather than to the turbine).

The engine 400 may be controlled by a controller 430, which may include a memory storing non-transitory instructions executable by a processor of the controller to carry out one or more methods described herein, similar to controller 112 of FIG. 1. In one example, controller 430 may include instructions executable to deactivate one or more cylinders of engine 400 responsive to engine speed and/or load being below a threshold speed-load range and activate electrically drivable compressor 416 responsive to deactivating the cylinders.

In some examples, a BISG system 421 may be coupled to engine 400. The BISG system 421 may include a starter-generator motor coupled to a battery and coupled to the engine via a belt. In one example, the starter-generator motor may be a 48 volt motor and the battery may be a 48 volt battery. A DC-DC converter may convert the 48 V output from the motor to 12 V for usage in a subset of the vehicle's electrical components. The electrically-drivable compressor 416 may be powered by the 48 V BISG system 421. As such, in some examples, when the electrically-drivable compressor 416 is activated, the motor torque of the motor of the BISG may be adjusted.

Figure 5:
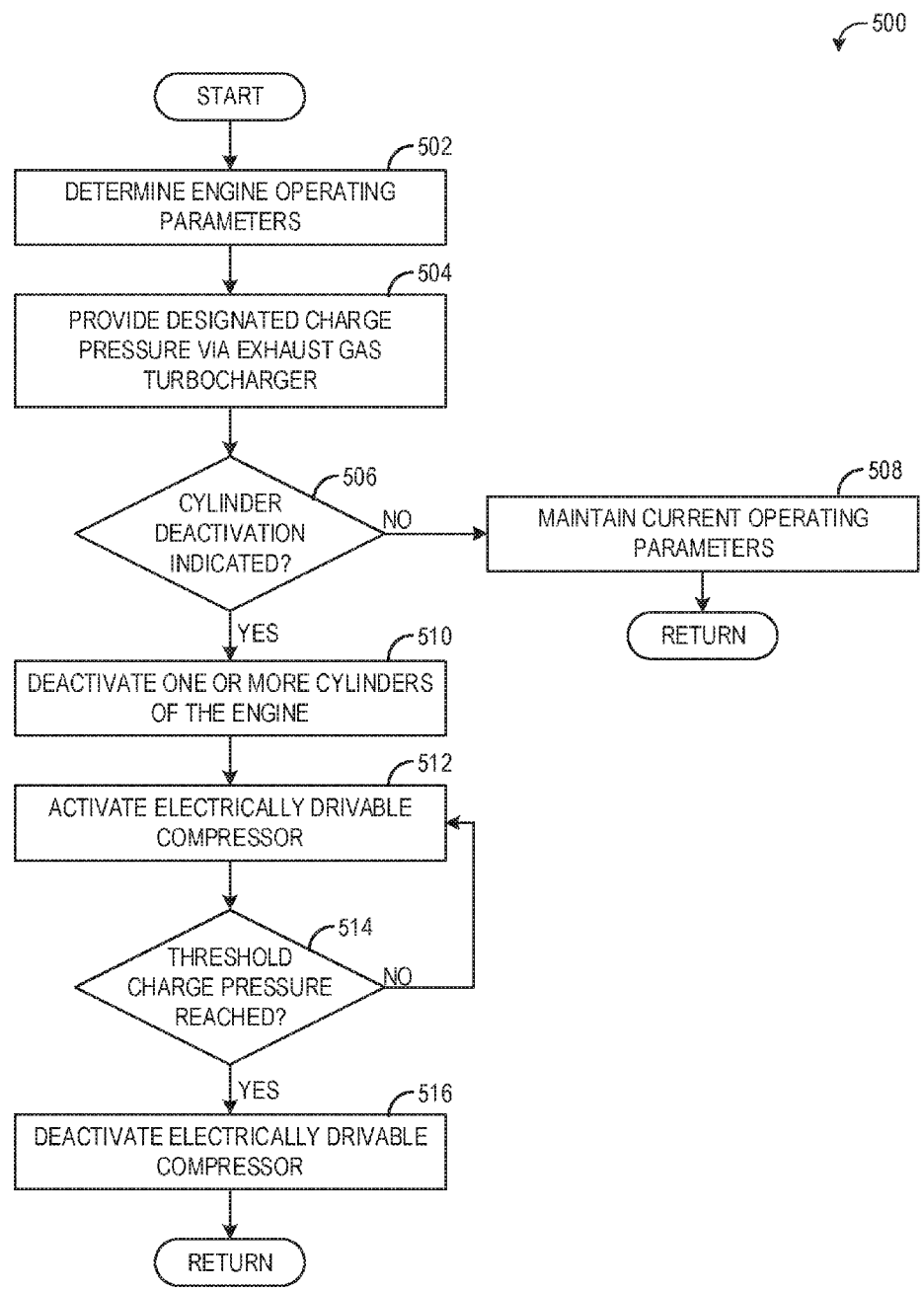
FIG. 5 is a flow chart illustrating a method for operating the engine of FIG. 4.

FIG. 5 is a flow chart illustrating a method 500 for operating an engine, such as the engine 400 of FIG. 4. Method 500 includes, at 502, determining engine operating parameters, which may include engine speed, engine load, etc. At 504, method 500 includes providing a designated charge pressure via an exhaust gas turbocharger. The designated charge pressure (also referred to as boost or boost pressure) may be based on engine speed and load, or other operating conditions, and is provided via compression of the intake air by a compressor of the exhaust-gas turbocharger, such as compressor 406 of FIG. 4. The compressor is coupled to and driven by an exhaust turbine, such as turbine 404 of FIG. 1.

At 506, method 500 determines if cylinder deactivation is indicated. Cylinder deactivation may be indicated when engine load is below a threshold load, such as below 30% of maximum rated load. If cylinder deactivation is not indicated, method 500 proceeds to 508 to maintain current operating parameters, which may include operating the engine with all cylinders active and providing boost via the exhaust-gas turbocharger. Further, an electrically-drivable cylinder in the intake system may be inactive. Method 500 then returns.

If at 506 it is determined that cylinder deactivation is indicated, method 500 proceeds to 510 to deactivate one or more cylinders of the engine. For example, as explained above with respect to FIG. 4, two cylinders of the four-cylinder engine may be deactivated. To deactivate a cylinder, fuel injection to the cylinder may be ceased, thus preventing combustion in that cylinder. In some examples, intake and exhaust valve actuation of the deactivated cylinder may continue, such that the deactivated cylinder continues to draw in and expel charge air. However, in other examples, intake and exhaust valve actuation may be adjusted such that the intake and exhaust valves of the deactivated cylinder do not open.

During cylinder deactivation, the remaining, active cylinders may receive an increased amount of fuel to continue to deliver requested engine torque. As such, these cylinders also utilize a larger amount of charge air, and thus the intake throttle valve may be opened to a greater degree during cylinder deactivation. However, the exhaust gas temperature may decrease, due to combustion only occurring in some of the cylinders. Collectively, this may result in the exhaust-gas turbocharger being unable to provide the designated charge pressure to deliver the requested torque. To prevent a lag in delivered torque during the transition to the cylinder deactivation mode, an electrically-drivable compressor may be activated, as indicated at 512. In this way, the electrically-drivable compressor, such as electrically-drivable compressor 416 of FIG. 4, may meet the charge demand so that requested torque is delivered. The electrically-drivable compressor may be activated via a voltage source being applied to a coil of a motor of the electrically-drivable compressor, thus causing a rotor of the motor to rotate and drive the compressor. When the electrically-drivable compressor is activated, a shut-off element in a bypass passage around the compressor may be closed so that charge air is directed through the activated compressor.

At 514, method 500 determines if a threshold charge pressure has been reached. The threshold charge pressure may be a designated charge pressure to deliver the requested torque, and thus reaching the threshold charge pressure may include reaching commanded/designated charge pressure. If the threshold charge pressure has not been met, method 500 loops back to 512 and continues to operate with the electrically-drivable compressor activated. If the threshold charge pressure has been met, method 500 proceeds to 516 to deactivate the electrically-drivable compressor, as the designated charge pressure is met via the exhaust-gas turbocharger. When the electrically-drivable compressor is deactivated, a shut-off element in a bypass passage around the compressor may be open so that charge air is able to bypass the deactivated compressor. Method 500 then returns.

The technical effect of providing an EGR turbocharger is to increase cooling of EGR to allow high rates of EGR, thus reducing NOx emissions.

As one embodiment a method for operating an internal combustion engine includes, during a transition to an operating mode of partial deactivation in which at least one switchable cylinder of the engine is deactivated, activating an electrically driveable compressor positioned in an intake system upstream of a compressor of an exhaust-gas turbocharger, the compressor of the exhaust-gas turbocharger driven by a turbine positioned in an exhaust system of the engine. The method may further include deactivating the electrically driveable compressor responsive to charge pressure in the intake system downstream of the compressor of the exhaust-gas turbocharger reaching a threshold pressure.

Another embodiment of a method includes adjusting a position of an exhaust gas recirculation (EGR) valve to deliver a designated amount of EGR to an intake of an engine; cooling the EGR via an EGR turbocharger and an EGR cooler prior to the EGR reaching the intake, the EGR turbocharger comprising an EGR compressor positioned in an EGR passage upstream of an EGR turbine; and selectively activating an auxiliary drive coupled to the EGR compressor. The method may further include, responsive to the designated amount of EGR exceeding a threshold amount, activating an electrically-drivable compressor positioned in the intake.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An auto-ignition supercharged internal combustion engine, comprising:
   at least one cylinder;
   an intake system for supplying charge air to the at least one cylinder;
   an exhaust-gas discharge system for discharging exhaust gas from the at least one cylinder;
   a first exhaust-gas turbocharger including a first turbine arranged in the exhaust-gas discharge system and a first compressor arranged in the intake system; and at least one exhaust-gas recirculation (EGR) arrangement comprising:
- a line which branches off from the exhaust-gas discharge system and opens into the intake system;
- a second exhaust-gas turbocharger comprising an EGR turbine arranged in the line on a shaft and an EGR compressor arranged in the line on the shaft upstream of said EGR turbine; and
- an EGR cooler positioned between the EGR turbine and the EGR compressor.

2. The auto-ignition supercharged internal combustion engine as claimed in claim 1, wherein the line for exhaust-gas recirculation branches off from the exhaust-gas discharge system downstream of the first turbine of the first exhaust-gas turbocharger.

3. The auto-ignition supercharged internal combustion engine as claimed in claim 2, wherein the line for exhaust-gas recirculation opens into the intake system upstream of the first compressor of the first exhaust-gas turbocharger.

4. The auto-ignition supercharged internal combustion engine as claimed in claim 1, wherein the line for exhaust-gas recirculation branches off from the exhaust-gas discharge system upstream of the first turbine of the first exhaust-gas turbocharger.

5. The auto-ignition supercharged internal combustion engine as claimed in claim 4, wherein the line for exhaust-gas recirculation opens into the intake system upstream of the first compressor of the first exhaust-gas turbocharger.

6. The auto-ignition supercharged internal combustion engine as claimed in claim 4, wherein the line for exhaust-gas recirculation opens into the intake system downstream of the first compressor of the first exhaust-gas turbocharger.

7. The auto-ignition supercharged internal combustion engine as claimed in claim 1, wherein the second exhaust-gas turbocharger provided in the line for exhaust-gas recirculation is equipped with an auxiliary drive.

8. The auto-ignition supercharged internal combustion engine as claimed in claim 7, wherein the auxiliary drive is an electric auxiliary drive comprising a stator and a rotor, wherein the rotor of the electric auxiliary drive is arranged on the shaft of the second exhaust-gas turbocharger.

9. The auto-ignition supercharged internal combustion engine as claimed in claim 8, further comprising a 48-volt belt integrated starter-generator (BISG) system configured to supply electricity to the electric auxiliary drive, and wherein a motor torque of the BISG system is adjusted responsive to activation of the electric auxiliary drive.

10. The auto-ignition supercharged internal combustion engine as claimed in claim 7, wherein the auxiliary drive is a mechanical auxiliary drive.

11. The auto-ignition supercharged internal combustion engine as claimed in claim 10, wherein the mechanical auxiliary drive is a traction mechanism drive comprising a first, driving wheel arranged on a crankshaft and at least one further, second, driven wheel arranged on the shaft of the second exhaust-gas turbocharger, a traction mechanism of the traction mechanism drive being guided around the first, driving wheel and around the at least one further, second, driven wheel.

12. The auto-ignition supercharged internal combustion engine as claimed in claim 1, further comprising a bypass line for bypassing the second exhaust-gas turbocharger arranged in the line for exhaust-gas recirculation.

13. The auto-ignition supercharged internal combustion engine as claimed in claim 12, wherein the bypass line branches off from the exhaust-gas discharge system upstream of the EGR compressor and opens into the exhaust-gas discharge system downstream of the EGR turbine.

14. The auto-ignition supercharged internal combustion engine as claimed in claim 1, further comprising a third exhaust-gas turbocharger comprising a third turbine arranged in the exhaust-gas discharge system and a third compressor arranged in the intake system.

15. The auto-ignition supercharged internal combustion engine as claimed in claim 1, wherein the first turbine of the first exhaust-gas turbocharger has a variable turbine geometry.

16. A method for operating an internal combustion engine, comprising:
- operating the engine in a fully active cylinder mode in which all engine cylinders are active and an electrically driveable compressor is deactivated, the electrically driveable compressor positioned in an intake system of the engine upstream of a compressor of an exhaust-gas turbocharger, and the compressor of the exhaust-gas turbocharger driven by a turbine positioned in an exhaust system of the engine; and
- during a transition from the fully active cylinder mode to an operating mode of partial deactivation in which fuel injection to at least one switchable cylinder of the engine is stopped, activating the electrically driveable compressor.

17. The method for operating the internal combustion engine as claimed in claim 16, further comprising, after activating the electrically driveable compressor, deactivating the electrically driveable compressor responsive to charge pressure in the intake system downstream of the compressor of the exhaust-gas turbocharger reaching a threshold pressure.

18. The method for operating the internal combustion engine as claimed in claim 16, wherein activating the electrically driveable compressor comprises supplying voltage to the electrically driveable compressor from a 48-volt belt integrated starter-generator (BISG) system, wherein a motor torque of the BISG system is adjusted responsive to activating the electrically driveable compressor.

19. A method, comprising:
- adjusting a position of an exhaust gas recirculation (EGR) valve to deliver a designated amount of EGR to an intake of an engine via an EGR passage which branches off from an exhaust of the engine and opens into the intake;
- cooling the EGR via an EGR turbocharger and an EGR cooler prior to the EGR reaching the intake, the EGR turbocharger comprising an EGR compressor and an EGR turbine which are both arranged in the EGR passage, and the EGR compressor positioned in the EGR passage upstream of the EGR turbine; and
- selectively activating an auxiliary drive coupled to the EGR compressor.

20. The method of claim 19, further comprising, responsive to the designated amount of EGR exceeding a threshold amount, activating an electrically-drivable compressor positioned in the intake.

* * * * *